US011228427B2

(12) United States Patent
Nair et al.

(10) Patent No.: US 11,228,427 B2
(45) Date of Patent: Jan. 18, 2022

(54) SYSTEM AND METHOD FOR SECURING CONTENT KEYS DELIVERED IN MANIFEST FILES

(71) Applicant: Ericsson AB, Stockholm (SE)

(72) Inventors: Raj Nair, Lexington, MA (US); Kevin J. Ma, Nashua, NH (US); Mikhail Mikhailov, Newton, MA (US)

(73) Assignee: Ericsson AB, Stockholm (SE)

( * ) Notice: Subject to any disclaimer, the term of this patent is extended or adjusted under 35 U.S.C. 154(b) by 500 days.

(21) Appl. No.: 14/618,598

(22) Filed: Feb. 10, 2015

(65) Prior Publication Data

US 2015/0229471 A1 Aug. 13, 2015

Related U.S. Application Data

(60) Provisional application No. 61/938,425, filed on Feb. 11, 2014.

(51) Int. Cl.
*H04L 9/08* (2006.01)
*H04L 9/14* (2006.01)

(52) U.S. Cl.
CPC .......... *H04L 9/0822* (2013.01); *H04L 9/0825* (2013.01); *H04L 9/0891* (2013.01);
(Continued)

(58) Field of Classification Search
CPC ... H04L 9/0822; H04L 9/0825; H04L 9/0891; H04L 9/14; H04L 2463/101; H04L 2463/102; H04L 2209/603; H04L 2209/24; H04L 9/0897; H04L 2209/60; H04L 63/20; G06F 21/10; G06F 2221/0797; G06F 12/14; G06F 21/60; H04N 21/4405; H04N 21/2541; G06Q 20/382; G06Q 30/06; H04W 12/06
See application file for complete search history.

(56) References Cited

U.S. PATENT DOCUMENTS 5,850,444 A 12/1998 Rune
6,947,556 B1 9/2005 Matyas, Jr. et al.
(Continued)

OTHER PUBLICATIONS

Wallendael et al., "Encryption for High Efficiency Video Coding with video adaptation capabilities," 2013 IEEE International Conference on Consumer Electronics (ICCE) Year: 2013 | Conference Paper | Publisher: IEEE.*

(Continued)

*Primary Examiner* — Roderick Tolentino
(74) *Attorney, Agent, or Firm* — The Danamraj Law Group, P.C.

(57) ABSTRACT

A method and a user device are disclosed for securing streaming content decryption. The method includes receiving at the user device a manifest for requested content, the manifest providing a Content Encryption Key (CEK) that is encrypted using a first public Key Encryption Key (KEK), a corresponding first private KEK being stored in secure storage on the user device; decrypting, inside a secure processing zone on the user device, the CEK using the first private KEK to create a decrypted content key; decrypting, inside the secure processing zone, requested content using the decrypted content key to form decrypted content; and providing the decrypted content to a decoder on the mobile user device.

20 Claims, 8 Drawing Sheets

(52) U.S. Cl.
CPC ............ *H04L 9/14* (2013.01); *H04L 2209/24* (2013.01); *H04L 2209/603* (2013.01)

(56) References Cited

U.S. PATENT DOCUMENTS

| | | | |
|---|---|---|---|
| 2002/0027992 A1* | 3/2002 | Matsuyama | H04L 9/321 380/231 |
| 2002/0169973 A1 | 11/2002 | Kim et al. | |
| 2006/0210082 A1* | 9/2006 | Devadas | G06F 21/31 380/277 |
| 2006/0236131 A1 | 10/2006 | Vauclair | |
| 2006/0274898 A1* | 12/2006 | Pedlow, Jr. | H04N 21/4345 380/277 |
| 2007/0079381 A1 | 4/2007 | Hartung et al. | |
| 2007/0092082 A1 | 4/2007 | Rush | |
| 2007/0256141 A1* | 11/2007 | Nakano | G06F 21/16 726/27 |
| 2008/0065548 A1* | 3/2008 | Muijen | H04N 7/1675 705/51 |
| 2008/0250217 A1* | 10/2008 | Kershaw | G06F 9/30101 711/163 |
| 2012/0150812 A1 | 6/2012 | Burns | |
| 2012/0155639 A1* | 6/2012 | Oney | H04N 21/63345 380/236 |
| 2013/0124859 A1 | 5/2013 | Pestoni et al. | |
| 2013/0145481 A1* | 6/2013 | Kozuka | G11B 20/00528 726/27 |
| 2013/0163758 A1* | 6/2013 | Swaminathan | H04L 9/0819 380/259 |
| 2013/0174271 A1* | 7/2013 | Handal | H04N 21/4753 726/27 |
| 2014/0013453 A1* | 1/2014 | Futa | G11B 20/00173 726/32 |
| 2014/0095890 A1* | 4/2014 | Mangalore | G06F 21/60 713/189 |
| 2014/0196079 A1* | 7/2014 | Jannard | H04L 9/0825 725/31 |
| 2016/0198202 A1* | 7/2016 | Van Brandenburg | H04N 21/4405 725/31 |

OTHER PUBLICATIONS

Asghar et al., "Efficient selective encryption with H.264/SVC CABAC bin-strings," 2012 19th IEEE International Conference on Image Processing Year: 2012 | Conference Paper | Publisher: IEEE.*

IP India, Examination Report, Application No. 201617027328, dated Dec. 26, 2019, 6 pgs.

* cited by examiner

SYSTEM AND METHOD FOR SECURING CONTENT KEYS DELIVERED IN MANIFEST FILES

FIELD OF THE DISCLOSURE

The present disclosure generally relates to digital rights management in a network environment. More particularly, and not by way of any limitation, the present disclosure is directed to a user device and method used on the user device to securely provide the content keys that are used to encrypt streaming content.

BACKGROUND

Steaming digital content over the Internet and other networks is bringing large amounts of content, including premium content, to homes, businesses and mobile devices. Owners of the digital content are anxious to provide this content to customers, but must protect against users who would gain illegal access to content.

SUMMARY

A method is described for securing content decryption in a client device such as a set top box, smartphone, tablet computer, etc. The technique employs symmetric encryption of content using content encryption keys (CEKs) that are securely delivered from a server to a client device in the manifest files.

In one general technique, the content encryption keys are securely delivered using symmetric encryption under a key encryption key (KEK) that is derived from a root key and periodically renewed. The client device includes both secure storage and a secure processing zone for encryption-related storage and processing, including persistent storage of the root key and storage of the current KEK. The secure processing zone is a processor operating environment generally including hardware- and firmware-level access control features along with software support functions that harden an implementation against casual or purposeful exposure of sensitive information.

In operation, a server or proxy in a content delivery infrastructure encrypts CEKs under the current KEK and includes them in manifest files that are delivered to the client device as part of the control stream for streaming content delivery. Use of manifest files for streaming delivery of segmented content is generally known. At the client device, the CEKs are decrypted inside the secure processing zone using the stored KEK, and the resulting decrypted CEK is used to decrypt the content, also in the secure processing zone. The decrypted content can then be rendered by a media player. The KEK is periodically renewed through a renewal message containing a new KEK encrypted with the root key.

In one aspect, an embodiment of a method operating at a user device for securing streaming content decryption is disclosed. The method includes receiving at the user device a manifest for requested content, the manifest providing a Content Encryption Key (CEK) that is encrypted using a first public Key Encryption Key (KEK), a corresponding first private KEK being stored in secure storage on the user device; decrypting, inside a secure processing zone on the user device, the CEK using the first private KEK to create a decrypted content key; decrypting, inside the secure processing zone, requested content using the decrypted content key to form decrypted content; and providing the decrypted content to a decoder on the mobile user device In a further aspect, an embodiment of a user device is disclosed. The user device comprises a processor; a non-secure processing zone that comprises a content request application; and a secure processing zone that comprises a secure memory, a streaming content player and a secure application program interface for receiving requests from the content request application, a decryptor being configured to receive a manifest for requested content, the manifest providing a Content Encryption Key that is encrypted using a public Key Encryption Key (KEK), a corresponding private KEK being stored in the secure memory, and to decrypt the CEK to create a decrypted CEK, decrypt the requested content using the decrypted CEK to form decrypted content, and provide the decrypted content to a decoder in the secure processing zone. Further features of the various embodiments are as claimed in the dependent claims.

In a still further aspect, an embodiment of a non-transitory computer-readable medium containing instructions stored thereon is disclosed. When the stored instructions are executed by a computer system configured to operate as a network personal video recorder (NPVR) element, the computer system is operable to perform an embodiment of the method set forth above. Further features of the various embodiments are as claimed in the dependent claims.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

In the following description, numerous specific details are set forth with respect to one or more embodiments of the present patent disclosure. However, it should be understood that one or more embodiments may be practiced without such specific details. In other instances, well-known subsystems, components, structures and techniques have not been shown in detail in order not to obscure the understanding of the example embodiments. Accordingly, it will be appreciated by one skilled in the art that the embodiments of the present disclosure may be practiced without such specific details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a network element, a subscriber device or end station, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. Thus, the storage device or component of a given electronic device may be configured to store code and/or data for execution on one or more processors of that electronic device for purposes of implementing one or more techniques of the present disclosure.

Referring now to the drawings and more particularly to FIGS. 1A-1D, a system 100 for securing streaming content decryption is shown. A user device 101 is equipped to receive and securely play encrypted streaming content, including high value content, from a content distribution network (CDN) and to receive a manifest for the content from content control server 102, which is associated with the CDN. User device 101 can be a discrete set top box (STB), personal computer, laptop, notebook computer, tablet, integrated TV/STB, smartphone, smart TV, video watch, dongle or the like. User device 101 is divided into a secure processing zone 110 and a non-secure processing zone 108, with all processing of encrypted streaming content being performed within secure processing zone 110. Applications that reside within secure processing zone 110 are tightly controlled and can only be changed using specific firmware-level protocols that are known to those skilled in the art. Applications that reside in non-secure processing zone 108 can be updated more easily, but may be subjected to specific restrictions, i.e., limitations on the source from which applications can be downloaded to the device. The security of user device 101, including both non-secure processing zone 108 and secure processing zone 110, is verified by a secure boot and authentication protocol as will be explained in greater detail below. In at least one embodiment, secure processing zone 110 is the ARM® TrustZone®. An example of one use of a secure processing zone and secure boot is shown in U.S. Pat. No. 8,925,055, which is owned by the assignee of the present application and which is incorporated by reference herein.

Figure 1A:
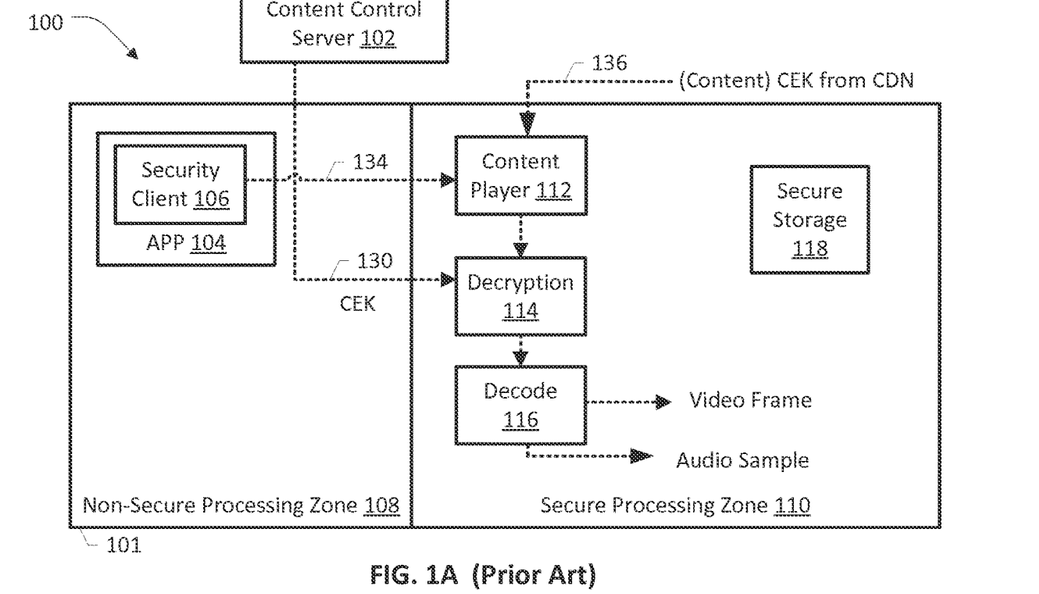
FIG. 1A depicts a block diagram of a system for securing streaming content decryption at a user device according to an embodiment of the present patent disclosure.
Figure 1B:
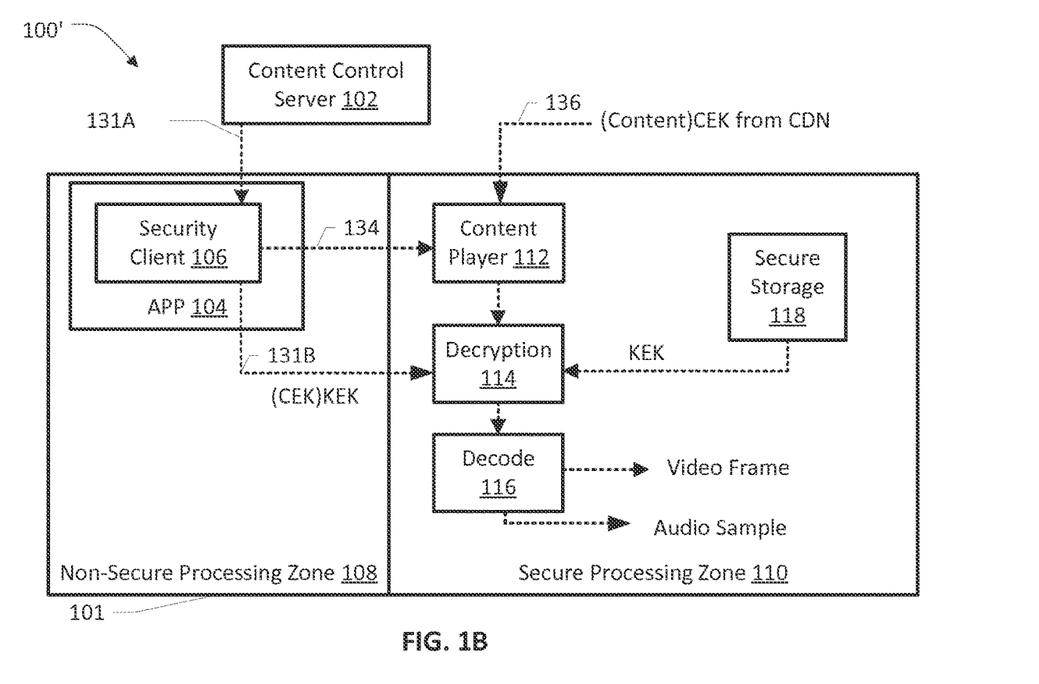
FIG. 1B depicts a block diagram of a system for securing streaming content decryption at a user device according to an embodiment of the present patent disclosure.
Figure 1C:
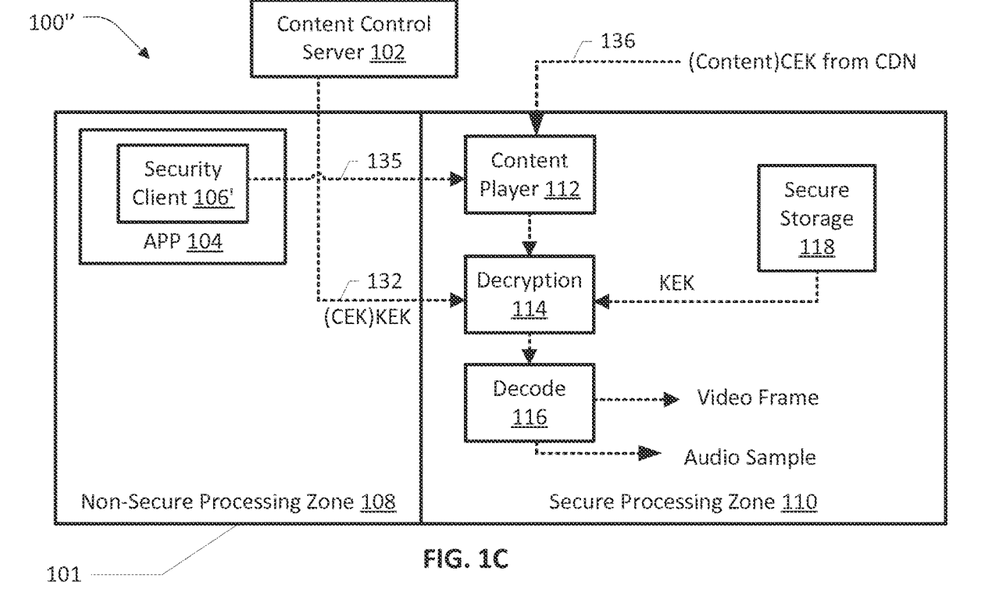
FIG. 1C depicts a block diagram of a system for securing streaming content decryption at a user device according to an embodiment of the present patent disclosure.

Looking further at user device 101, non-secure processing zone 108 includes application (APP) 104, which provides a user interface for the selection of streaming content. APP 104 can be a browser or a dedicated application for the selection of streaming content. Security client 106 is embedded in APP 104 and participates in the authentication of user device 101 with a digital rights management (DRM) server, as will be discussed below, and further checks the user's entitlement to access the requested content. In at least one embodiment (not specifically shown), security client 106 is deployed as a virtual media controller in a network server, rather than being part of APP 104; this embodiment will be discussed in greater detail below. Within secure processing zone 110, are streaming content player 112, decryption element 114, also referred to herein as decryptor 114, and decode element 116, also referred to as decoder 116.

FIG. 1A illustrates both the components of a system for securing streaming content decryption and information flow between these components according to the prior art. Security client 106 sends requests for content to content player 112 using connection 134. Content player 112 receives content, which has been encrypted using a content encryption key (CEK), from the content delivery network using connection 136. For the purposes of these drawings, (Content) CEK represents content that is encrypted using the key CEK. User devices will typically receive the manifest for requested content with other control data that is sent separately from the encrypted content, with the CEK being provided in a field within the manifest. It will be understood that the CEK can be physically present in the manifest or can be provided by the manifest in some other fashion. For example, when the content is encrypted in HTTP Live Streaming (HLS), the manifest carries a URI that points to the encrypted CEK. In prior art system 100, content control server 102 sends the CEK to decryptor 114 via secure connection 130, which can be Secure Sockets Layer (SSL), a standard security technology for establishing an encrypted link. In this embodiment, the CEK is not sent encrypted, but in the clear, with secure connection 130 providing the necessary protection. The CEK is securely received at decryptor 114 and used to decrypt the content received from the CDN. However, it is desirable to be able to provide the manifest, and therefore the CEK, over a non-secure connection while maintaining the security of the CEK. It can also be desirable to provide additional security for high-value content, such as premium movies. Two embodiments of an environment for securely sending the CEK over an unencrypted connection will now be discussed with reference to FIGS. 1B-1C and to FIG. 2A. In these embodiments, the CEK is itself encrypted using a Key Encryption Key (KEK) that has been previously shared between the user device and a DRM server. The KEK is stored in encrypted form in secure storage 118 and can only be updated using firmware-level processing. One skilled in the art will understand that in the embodiments shown in FIGS. 1B and 1C, the manifest can also be sent over a secure connection if such is available.

Figure 2A:
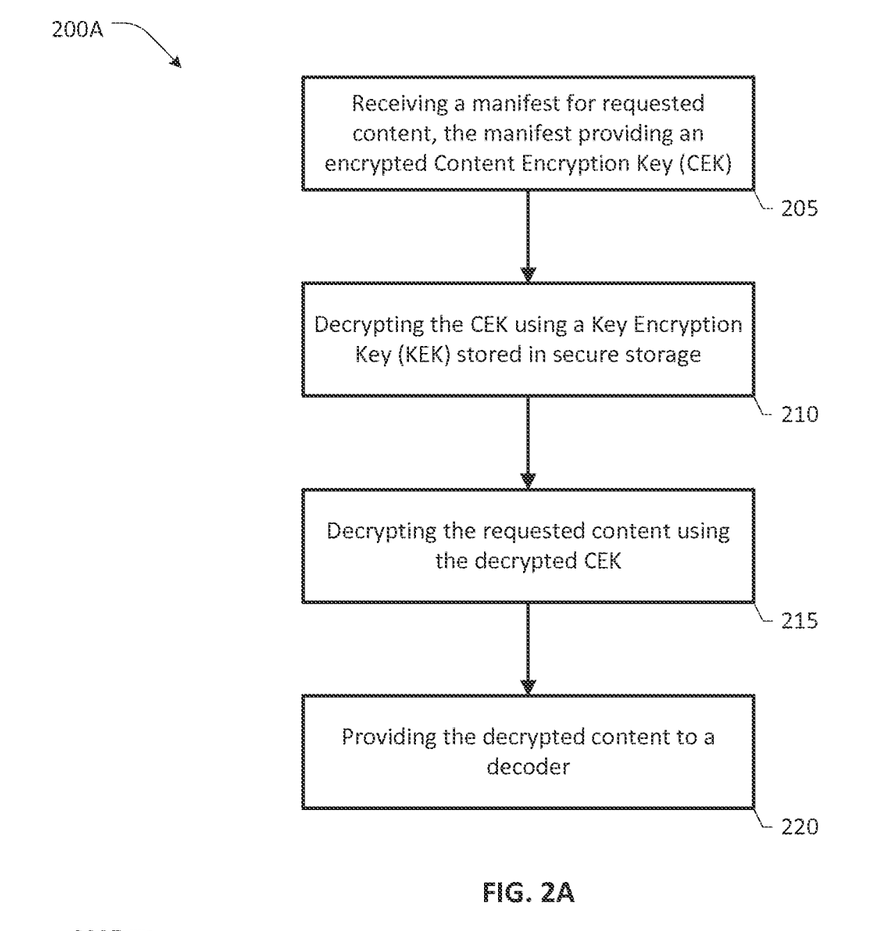
FIG. 2A depicts a flowchart of a method for securing streaming content decryption at a user device according to an embodiment of the present patent application.

FIG. 2A depicts a method 200A for a securing a content encryption key provided in a manifest file. The method begins with receiving (205) a manifest for requested content; the manifest providing an encrypted CEK that has been used to encrypt the streaming media for transmission. As shown in system 100' of FIG. 1B, content control server 102 sends the CEK to security client 106 over connection 131A. In at least one embodiment, content control server 102 provides the encrypted CEK to security client 106 via a third party (not specifically shown) that inserts the encrypted CEK into the manifest and provides the manifest to the CDN for delivery to user device 101. Security client 106 receives the CEK and sends the CEK to decryptor 114 using connection 131B. Unlike the embodiment shown in FIG. 1A in which connection 130 between content control server 102 and decryptor 114 is an SSL connection, connection 131 does not need to be a secure connection, although it can be if desired. In system 100', content control server 102 provides a CEK, which has been encrypted using the KEK that has been previously stored in secure storage 118. The KEK is stored in encrypted form and can be distributed, replaced or revoked using firmware-level commands only. In addition to providing the CEK, the manifest can provide multiple bitrates for viewing the requested media stream and the means to request content at each available bitrate. In at least one embodiment, the content is streamed using HLS protocol, although it will be understood that the streaming protocol can also be Dynamic Adaptive Streaming over HTTP (DASH) or any other known or currently unknown protocol. In at least one embodiment, the encrypted CEK is physically carried in the manifest. In at least one embodiment, the manifest carries a URI that point to the location of the encrypted CEK. This location can be anywhere, e.g., on an external server, such as content control server 102, a server in the CDN, or a location on user device 101. In at least one embodiment, the CEK is encrypted using the AES-128 encryption method.

Once the CEK has been acquired, the method of FIG. 2A continues with decrypting (210) the CEK using the KEK that is stored in secure storage on the user device. The KEK, as well as the CEK, is always stored in encrypted form on user device 101. As seen in FIG. 1B, the KEK is retrieved from secure storage 118 by decryption element 114. Once the CEK is decrypted, the method continues with decrypting (215) the requested content as it is provided, using the CEK. After decryption of the content, the method finishes with providing (220) the decrypted content to a decoder, such as decoder 116. It will be understood by one skilled in the art that further processing of the received content can occur, with the content ultimately being providing to a screen for viewing by the user.

A system 100" for providing an encrypted CEK to user device 101 is illustrated in FIG. 1C. This embodiment is similar to the embodiment of FIG. 1B, in that security client 106' of application 104 sends a request for content to content player 112 over connection 135 and the content delivery network (CDN) sends content that is encrypted using the CEK to content player 112 over connection 236. In this embodiment, content control server 102 does not provide the CEK via security client 106. Instead, content control server 102 provides the CEK directly to decryption element 114 in secure processing zone 110 using connection 132. In at least one embodiment, content control server 102 provides the encrypted CEK to decryption element 114 via a third party (not specifically shown) that inserts the encrypted CEK into the manifest and provides the manifest to the CDN for delivery to user device 101. Like connection 131 in the embodiment of FIG. 1B, connection 132 does not need to be a secure connection, since the CEK is provided in encrypted form, although a secure connection can be utilized for additional security. Decryptor 114 accesses the KEK from secure storage 118 to decrypt the CEK and use the decrypted CEK to decrypt the encrypted streaming content. The decrypted content is sent to decoder 216, which provides the video frames and audio stream as shown. Although this embodiment shows security client 106 as part of APP 104, sending the manifest directly to decryptor 114 can also be used when security client 106 is deployed as a virtual media-controller at a network server.

Figure 1D:
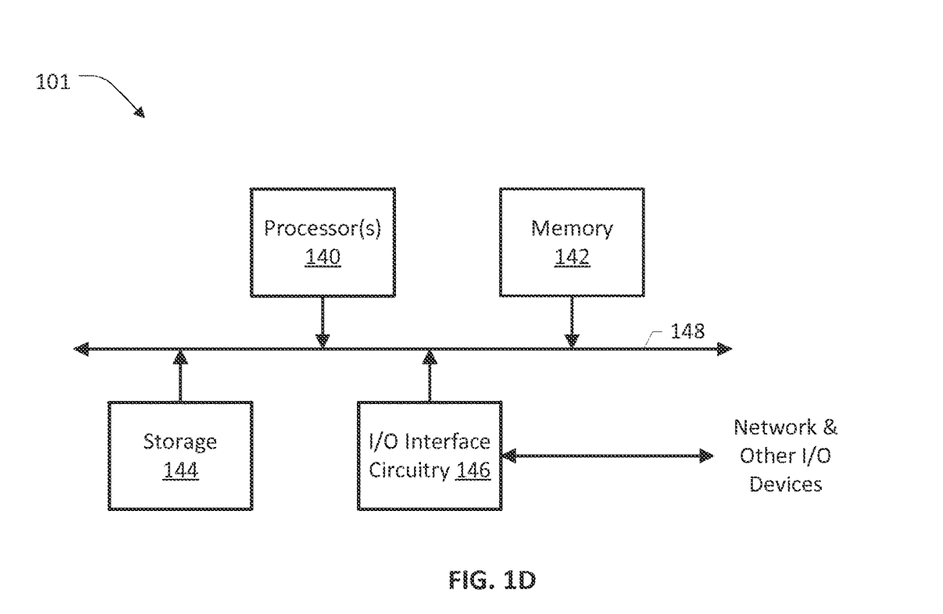
FIG. 1D depicts a block diagram of the hardware organization of a user device according to an embodiment of the present patent disclosure.

FIG. 1D is a generalized block diagram of the hardware organization of a user device such as the user devices shown in FIGS. 1A, 1B, 1C. User device 101 includes one or more processors 140, memory 142, local storage 144 and input/output (I/O) interface circuitry 146 coupled together by one or more data buses 148. The I/O interface circuitry 146 couples the device to one or more external networks, additional storage devices or systems, and other input/output devices as generally known in the art. System-level functionality of the device as described herein is provided by the hardware executing computer program instructions, typically stored in the memory 142 and retrieved and executed by the processor(s) 140. It is common, although not required, that environments that have both secure and non-secure processing zones will have at least two processors, including a secure processor and a non-secure processor. Typically, the non-secure processor is not able to access programs or data that reside within the secure processing zone, while the secure processor is able to access any location on the user device.

The content encryption key (CEK) can be updated as desired. The key encryption key (KEK) that is stored in secure storage 118 and used to decrypt the CEK can also be updated, but only using specific firmware-level messages that are of two types, distribution and control. The distribution message can be used to initially provide one or more KEKs or to add additional KEKs without removing existing KEKs. Control messages are used to revoke or replace one or more existing KEKs. Formats for each of these messages are as follows:
Distribution Message Format:
    KEK-ID 1SP "dis"["tribute"] 1SP KEYLEN 1SP KEY
Revoke message format:
    KEK-ID 1SP "rev"["oke"] 1sp HMAC
Replace message format:
    KEK-ID 1SP "rep"["place"] 1SP KEYLEN 1SP KEY 1SP HMAC In each of these formats, KEK-ID is the key identification associated with a KEK, KEYLEN is the length of the key in bytes, and KEY depends on the message type: replacement KEKs are encrypted with MASTER, CEKs are encrypted with KEK. KEK replacement or revocation includes a hash message authentication code (HMAC). Revocation messages can be encrypted. The contents and format of each of the fields in the message is as follows:
    KEK-ID=*TEXT
    KEY-LEN=*DIGIT
    KEY=*OCTET
    HMAC=*HEX
where
    OCTET=<any 8-bit sequence of data>
    TEXT=<any US-ASCII visible character (octet 33-126)>
    DIGIT=<any US-ASCII digit "0" . . . "9" (octets 48-57)>
    SP=<US-ASCII SP, space (32)>
    HEX="A"|"B"|"C" |"D"|"E"|"F"
       |"a"|"b"|"c"|"d"|"e"|"f" | DIGIT KEK revocation and replacement can be performed using either a server push or a registration step to determine the KEKs stored at the client and which of the stored KEKs are no longer valid. When a registration step is used, the user device contacts a central authority and uses a key revocation/replacement protocol for communications between the client and central authority.

Figure 2B:
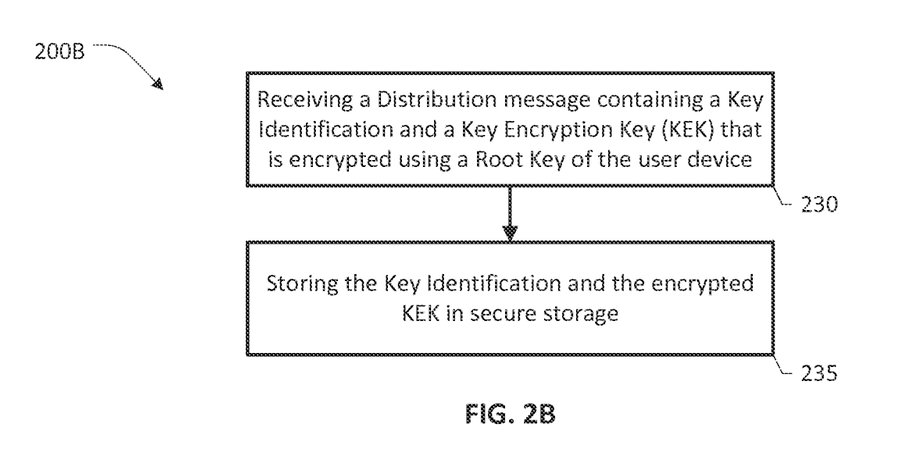
FIG. 2B depicts a flowchart of a method for distributing a Key Encryption Key according to an embodiment of the present patent application.
Figure 2C:
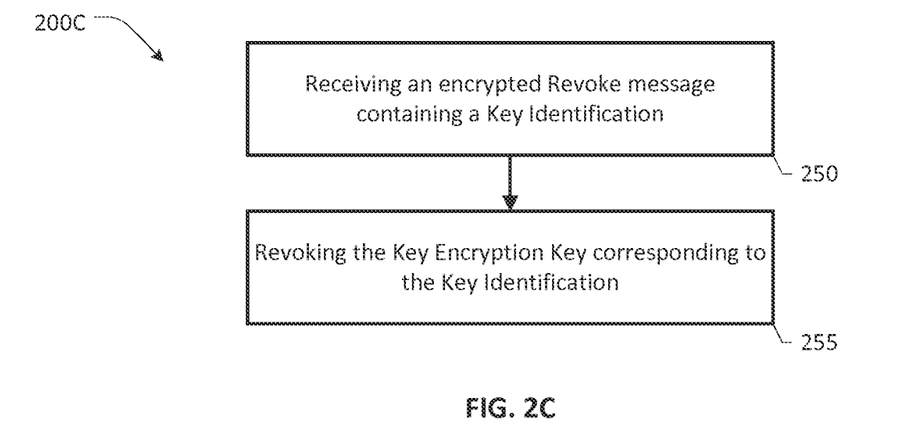
FIG. 2C depicts a flowchart of a method for revoking a Key Encryption Key according to an embodiment of the present patent application.
Figure 2D:
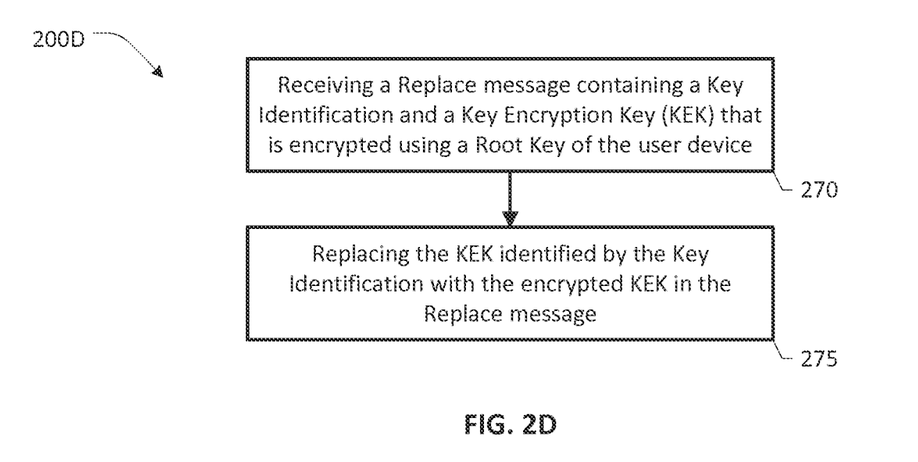
FIG. 2D depicts a flowchart of a method for replacing a Key Encryption Key according to an embodiment of the present patent application.
Figure 2E:
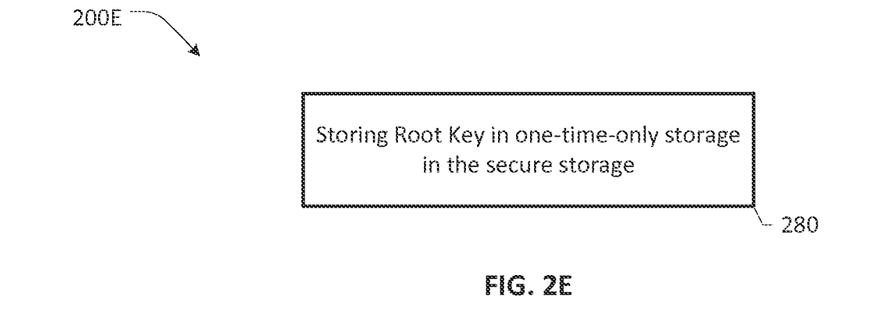
FIG. 2E depicts a flowchart of a method for securing a root key according to an embodiment of the present patent application.

The necessary elements for performing key distribution, revocation and replacement are illustrated in FIGS. 2B-2D. In FIG. 2B the user device receives (230) a distribution message as shown above. The distribution message contains a key identification and a corresponding key encryption key (KEK), which is encrypted with a root key. A copy of the root key has been previously stored in secure storage 118 for use in unencrypting the received KEK. In at least one embodiment, the distribution message provides multiple keys, with each KEK having a separate key identification. The secure processor stores (235) both the key identification and the encrypted KEK in secure storage 118.

In FIG. 2C, the user device receives (250) a revoke message, as shown above, which contains a key identification. In at least one embodiment, the revoke message is encrypted, e.g., using the root key. The secure processor then revokes (255) the KEK that corresponds to the key identification in the revoke message. In FIG. 2D, the user device receives (270) a replace message according to the format shown above; the replace message contains a key identification and a KEK that is encrypted using the root key. The secure processor locates the KEK having the same key identification and replaces (275) the stored KEK with the newly received KEK of the same key identification. FIG. 2D illustrates the management of the root key. The root key is stored (i.e., burned) in one-time-only storage in secure storage 118 at the time of equipment manufacture. No changes or replacements can be made to the root key.

In order to ensure the security of user device 101 and thus the security of encrypted content that is provided using user device 101, it is necessary to establish and maintain a trust relationship between the service provider and the user device that receives the encrypted streaming content. For example, most studios require a hardware root of trust as a precondition for a high definition (HD) (i.e. 1080p) entitlement. The following sections discuss the establishment of a hardware root of trust and secure video playout. The embodiment discussed in the following sections is directed to a device that is capable of receiving encrypted high-value content, such as premium HD movies, and providing the unencrypted content to an authorized user. An overview of the secure boot and registration process is shown, followed by a discussion of the use of keys and certificates, a secure audio/visual data path, and additional security measures. Finally, a more detailed discussion of the boot and registration processes is provided.

Secure Boot: Ensuring Firmware and Software Integrity

The goal of secure boot is to ensure the legitimacy and integrity of all firmware and system software that runs on the device. In addition to code signing, this means ensuring that only trusted code is run on the device. This can be met using the following concepts:

Legitimacy can be established for each piece of device firmware and software by having such firmware and software elements immutably burned into hardware at manufacturing. Alternatively, legitimacy can be established by having such firmware and software elements be cryptographically validated to be authentic.

When code signing is used for firmware and software cryptographic validation, all such validation is RSA with key length 2048, where the key pairs are generated with sufficient randomness equivalent to 2048 bits of entropy.

Figure 3:
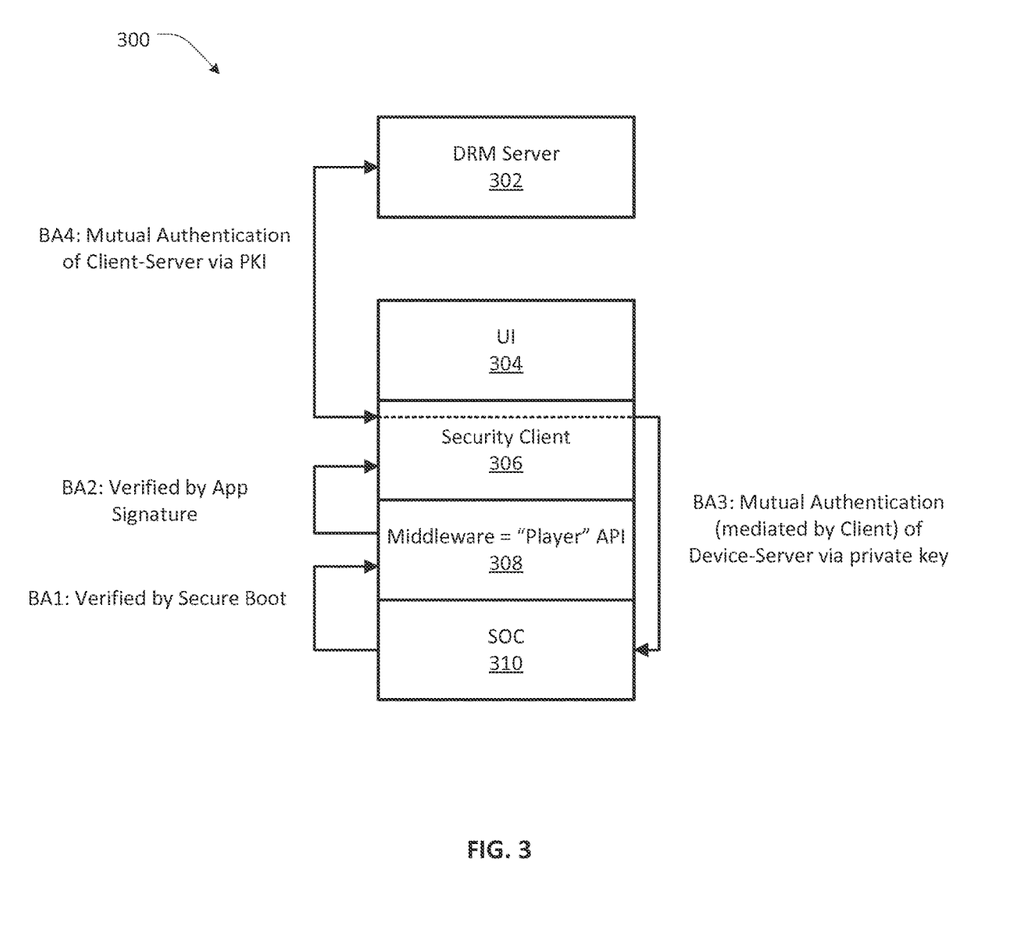
FIG. 3 depicts a block diagram of the establishment of a trust relationship between the key elements of the system for streaming secure content according to an embodiment of the present patent disclosure.

FIG. 3 is a block diagram depicting the establishment of a trust relationship between the key functional elements both within the device and outside, as well as the overall interactions between these elements for the purposes of secure boot and subsequent device and service authentication. This figure depicts digital rights management (DRM) server 302 and, as part of a user device, user interface (UI) 304, security client 306, middleware such as the player application programming interface (API) 308, and a system-on-a-chip (SOC) 310. Security client 306 can be, for example, security client 106 of user device 101 and the SOC can be the secure processing zone 110, which can be provided as a system-on-a-chip, such as ARM® TrustZone®. Middleware 308 will include an application interface between security client 306 and the content player that resides on SOC 310, but can also include other code. In one embodiment, the user device can be a hybrid set top box, with middleware 308 that includes code to manage the transfer of information from multiple multi-cast channels to the secure processing zone on SOC 310 and to manage home security, as well as the player interface shown. DRM 302 is part of a service provider network for the user device, which needs to establish mutual validation with the user device. When SOC 310 boots, this secure processing zone first verifies (BA1) that middleware 308 is valid. Once middleware 308 is verified, the SOC will verify (BA2) that security client 306 is also valid. Once each of these elements is verified, SOC 310 performs a mutual authentication (BA3, BA4) of the user device with DRM server 302, mediated by security client 306. Each of these elements of the method will be discussed in greater detail below.

Authentication and DRM—Use of Keys and Certificates

To support device and service authentication as well as to support secure key exchange for purposes of digital rights management (DRM), the following cryptographic elements are provisioned on the user device at the time of manufacture:

- an SSL Client Certificate (X.509), which is device specific and signed by a well-known certificate authority (CA). The certificate includes a public key corresponding to the SSL Client Private Key and is updateable in the field.
- SSL Client Private Key, which is at least 2048 bit, RSA, device specific, and updateable in the field.
- Private Key Lpriv, which is at least 2048 bit, RSA. Private Key Lpriv is provisioned by the original equipment manufacturer (OEM) and must be securely provisioned into the SOC using one-time-programmable memory and hash locked. Corresponding public key Lpub is maintained by the original equipment manufacturer. This field is not updatable and is only set once, during manufacturing.
- Private Key Encryption Key (KEKpriv), which must be at least 2048 bit, RSA. KEKpriv can be provided by the OEM and securely provisioned at the time of manufacture. Alternatively, KEKpriv can be securely provisioned by a service provider prior to use by a customer. KEKpriv is software updateable in the field and is stored in encrypted form, encrypted by Lpriv. The corresponding public key KEKpub is maintained by the OEM or service provider. One skilled in the art will understand that references herein to the KEK stored on the user devices shown in FIGS. 1B and 1C are referring to KEKpriv, while references herein to the content encryption key being encrypted by KEK refer to KEKpub.

Table 1 below summarizes these security elements:

TABLE 1

| Cryptographic Element | Cryptographic Properties | Creation Properties | Security | Owner | Updatability |
|---|---|---|---|---|---|
| SSL Client Certificate | Signed, well-known CA | Device-specific, eg serial no | Secure Storage* | SOC vendor | Updateable in the field |
| SSL Client Private Key | 2048 bit; RSA | Device-specific | Secure Storage* | SOC vendor | Updateable in the field |
| Lpriv | 2048 bit; RSA | Provisioned | OTP; Hash locked | OEM/ SP | No |
| KEKpriv | 2048 bit; RSA | Provisioned | Secure Storage* | OEM/ SP | Via secure software update |

*Cryptographically equivalent in strength to AES 128 bit encryption.

Device registration is a procedure that is executed by security client 306 for two purposes: (1) to authenticate both the user device 101 and the specific application 104 that contains security client 306 to DRM server 302; and (2) to authenticate DRM server 302 to security client 306. The second purpose is achieved by including a server signing certificate in secure client 306 while the first purpose is achieved by using the private key (Lpriv) provisioned into the hardware to encrypt an information element in the registration message and conveying that message to DRM server 302 via a two-way SSL connection. The possession of Lpriv proves the authenticity of the hardware and possession of the SSL Client Certificate establishes the identity of the device. The application (app) 104 containing security client 306 is authenticated to DRM server 302 by using an application-specific key that is included in the security client to encrypt the registration message. The possession of the key authenticates the application. Notably, both the SSL Certificate and app 104 are renewable.

Security client 306 constructs a registration message to authenticate the device to the DRM server. This registration message is sent using a secure SSL connection that employs the device specific SSL certificate and private key to authenticate and secure the communication channel. The registration message includes an information element that contains information specific, e.g., to user device 101 and application 104; this information element is encrypted with private key Lpriv. The DRM server uses public key Lpub to decrypt the information element to authenticate user device 101 and application 104, i.e. the service. The DRM server responds to the registration with an object which is encrypted with Lpub. The secure processor decrypts the object using Lpriv to complete the authentication process. A detailed example follows below with regard to FIG. 6. This process runs under the following conditions:

- The SSL implementation used for registration communication between security client 306 and DRM server 302 runs in a Trusted Execution Environment (TEE) and employs the SSL certificate and SSL private key identified above.
- The operation to encrypt the device and application information element runs in a TEE.
- The user device provides an internal API (API-A) for encryption of the device-and-application-specific information element with the key Lpriv. In at least one embodiment, API-A follows the GlobalPlatform TEE Internal Core API Specification v1.1 TEE_CipherUpdate with algorithm TEE_ALG_RSAES_PKCS1_OAEP_MGF1_SHA256 and mode is TEE_MODE_ENCRYPT.
- The user device provides an internal API (API-B) for decryption of the encrypted object contained in the registration response using the key Lpriv to decrypt. In at least one embodiment, API-B follows the GlobalPlatform TEE Internal Core API Specification v1.1 TEE_CipherUpdate with algorithm TEE_ALG_RSAES_PKCS1_OAEP_MGF1_SHA256 and mode is TEE_MODE_DECRYPT.

To support DRM for secure video playback, user device 101 provides a two-way SSL connection between content control server 102 and content player 112, protection of the content encryption key (CEK) using the key encryption key (KEK), and content that is decrypted, decoded, and rendered in a Trusted Execution Environment (TEE). The two-way SSL between content control server 102 and content player 112 uses SSL Client and Server Certificates to send manifest files to the player. This results in the following element:

The SSL implementation used for security client 106 to content player 112 communication runs in a Trusted Execution Environment (TEE) and employs the SSL certificate and private key identified above.

A key encryption key (KEK) is used for protection of the content encryption key (CEK), which is a symmetric AES key. Content control server 102 will produce manifests that provide an encrypted key, which is created by encrypting the CEK with KEKpub to ensure its confidentiality. In an example embodiment in which HLS is used for streaming content, the manifest contains a URL to the encrypted CEK. The secure processor of user device 101 provides for secure decryption of content by first decrypting the encrypted CEK using KEKpriv to extract the CEK, then decrypting media content using the decrypted CEK. The following elements provide additional support.

KEKpriv is software updateable, as follows: DRM server 302 can securely transport KEKpriv to security client 306 running on the user device where the KEKpriv itself is encrypted with the asymmetric public master key Lpub that ensures its confidentiality. The encrypted KEKpriv is placed in secure storage in the device by employing an internal software API.

This internal software API follows the GlobalPlatform TEE Internal API Specification v1.0, TEE_SetOperationKey where the key material is the encrypted KEK, the algorithm is TEE_ALG_RSAES_PKCS1_OAEP_MGF1_SHA256 and the mode is TEE_MODE_DECRYPT. This API is implemented by the firmware and called by security client 306 to update the KEKpriv as needed.

Content control server 102 provides a content encryption key (CEK) encrypted with KEKpub in the manifest file. In at least one embodiment, a proxy carried on user device 101 provides the CEK.

Content is decrypted, decoded, and rendered in a Trusted Execution Environment (TEE), such as secure processing zone 110.

Keys are stored only in secure memory and are never exposed outside of the TEE.

Secure A/V Data Path

A secure audiovisual data path is used to ensure that content keys and compressed and decompressed content is accessible only by authorized application software running in a Trusted Execution Environment, such as secure processing zone 110. Audio and video data is protected from the point of decryption to the point of protected output. The secure AN data path has these elements:

Buffers used for video decryption, decoding and rendering are held only in secure memory. This also applies to compositing operations, such as menu overlay, and supports the use case where a menu needs to be overlaid on protected content. During the compositing operation, access to audio and video samples is allowed only to authorized software or hardware. In one embodiment, this is achieved by a combination of memory and bus encryption and scrambling. However, only uncompressed decrypted content is allowed to traverse any external bus.

The API to access the secure video path follows GlobalPlatform TMPP standard, Global Platform System Requirement for PCTF V1.2. Thus, a decryption API is obtained by extending the GlobalPlatform TEE Internal API, TEE_CipherUpdate with algorithm "TEE_ALG_AES_CBC_ABR" and mode "TEE_MODE_DECRYPT" to operate using the encrypted CEK, encrypted with KEKpub, passed in via the manifest file. This algorithm performs AES decryption on the selected incoming encrypted stream by first fetching the encrypted KEKpriv, encrypted with Lpub, decrypting it to obtain KEKpriv, then using KEKpriv to decrypt the CEK, and finally using the CEK to decrypt the media, sending output to the decoder via a secure internal path to the decoder and renderer.

Unencrypted, compressed AV data never traverses any chip external physical bus.

If unencrypted, decompressed AV data traverses a chip external physical bus, Address Space Layout Randomization (ASLR) is used for obfuscation commensurate with or greater than the complexity of encryption with a key of the max length of keys transported, e.g., 128 bits for the CEK in HLS.

Figure 4:
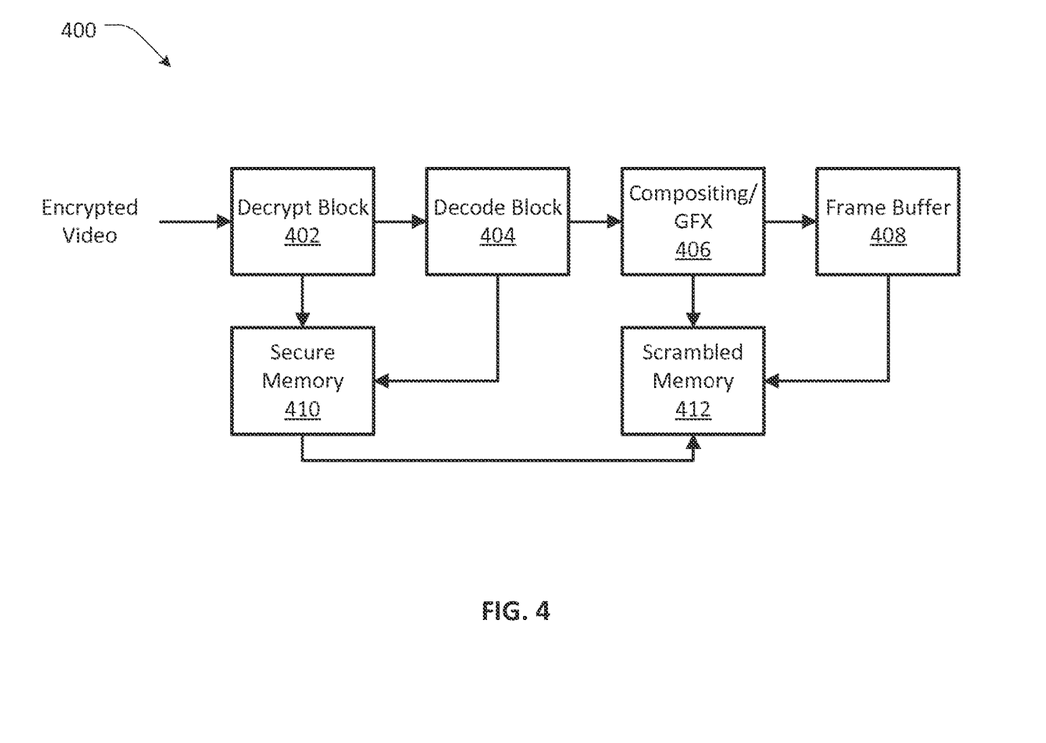
FIG. 4 depicts a block diagram of the processing of encrypted video within the secure memory according to an embodiment of the present patent disclosure.

FIG. 4 illustrates the secure audiovisual pathway 400. In general in this diagram, the blocks on the top of the figure carry video data, while the lower blocks, secure memory 410 and scrambled memory 412, are for the exchange of keys that are used by multiple blocks. Encrypted video, i.e. video encrypted with CEK, is received at decrypt block 402, which decrypts the CEK as noted above and uses the CEK to decrypt the received content. Decrypt block 402 sends the decrypted video to decode block 404, which decodes the video stream and passes the decoded video on to compositing/graphics (GFX) block 406. Both decrypt block 402 and decode block 404 can access secure memory 410 as necessary to retrieve or pass keys. Compositing GFX block 406 forms a composite of the decoded video stream and any additional information necessary, such as displaying the menu, and passes the composited video to frame buffer 408. Keys in secure memory 410 can be passed to scrambled memory 412 for use by compositing/GFX block 406 and frame buffer 408. In at least one embodiment, this entire pathway is contained in secure processing zone 110 of user device 101. In at least one embodiment, frame buffer 408 is the sole element that is not contained in secure processing zone 110. In this latter instance, the location or device containing frame buffer 408 is added to the authentication processing that is performed prior to registration.

Additional Protections

In addition to the authentication schemes and the use of keys discussed above, user device 101 provides several additional protections, namely a high degree of randomness in random number generators, protections on output provided by the user device, and debug port security. With regard to random numbers, a random number generator (RNG) on user device 101 can be either hardware or software based, but meets the following guidelines:

Each random number produced is based on entropy equivalent to the length of the random number; and The RNG algorithm has randomness equal or greater than the NIST CTR DRBG algorithm.

Protection of the output of user device 101 is engaged at all times during playback and prevents unauthorized copying of video data. The standard of protection used is dependent on the type of output. Output of user device 101 follows the following standards of copy protection:

For uncompressed HDMI output, High-bandwidth Digital Content Protection (HDCP) 1.4+ is used;
For compressed HDMI output, e.g., Miracast, HDCP 2.2+ is used;
For analog outputs, CGMS-A/Macrovision is used;
For USB/Ethernet outputs, Digital Transmission Content Protection (DTCP) is used.

User device 101 further provides security around commonly used development and test debug ports by the following:
JTAG and other SOC-specific debug ports are fused closed.

Detail of Secure Boot and Registration

Figure 5:
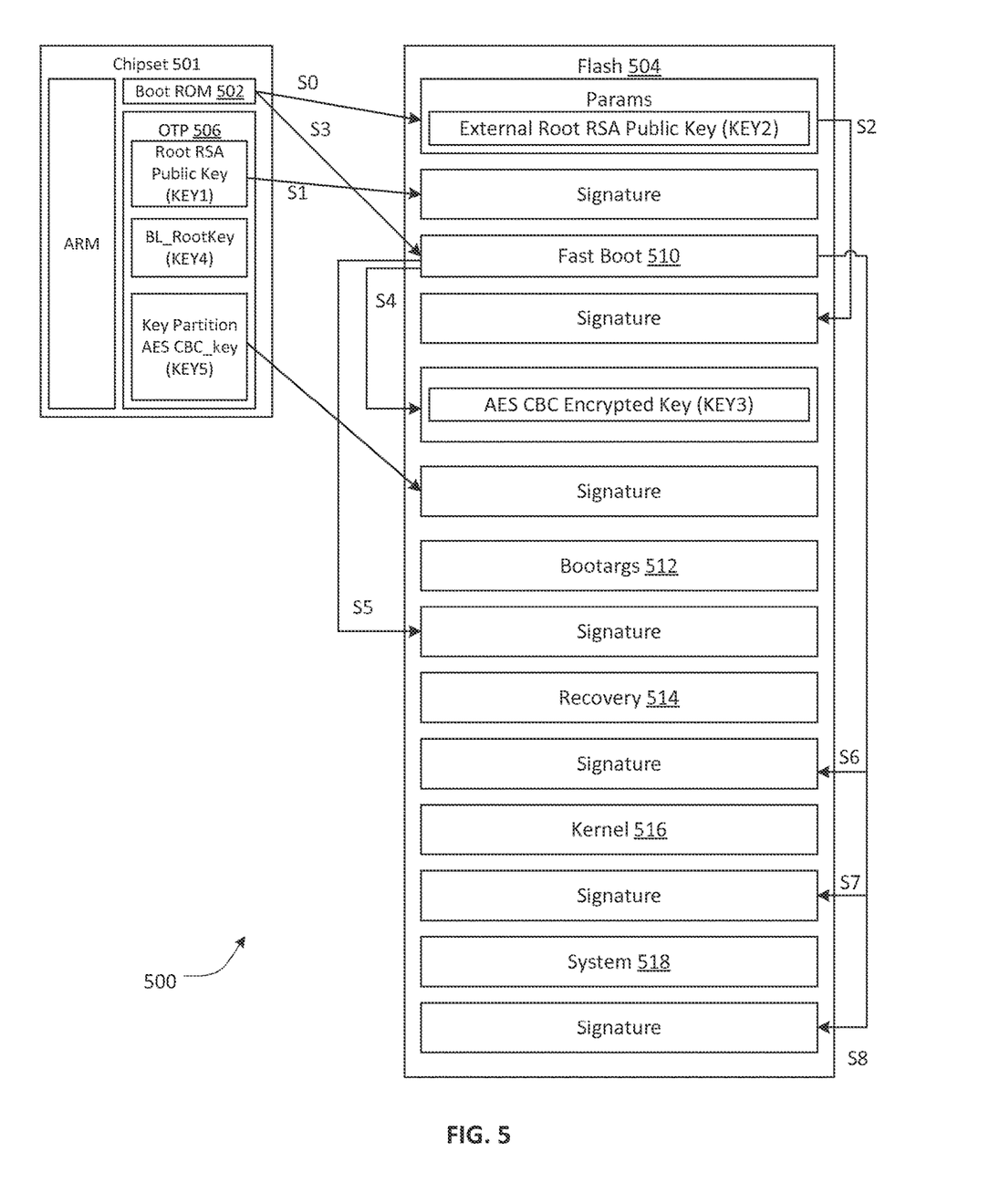
FIG. 5 depicts a block diagram of the first two elements in the establishment of a trust relationship of FIG. 3 in greater detail according to an embodiment of the present patent disclosure.

FIG. 5 is another view of the process labelled BA1 and BA2 in FIG. 3, with greater detail. This figure depicts a process for establishing a root of trust with the DRM server in which the first step involves the verification of the secure boot image and the hosted operating system (OS). An example of this process will be described; however, one skilled in the art will understand that variations will be appropriate for specific SOCs and that other devices can contain other code blobs than those shown in this figure. An example secure boot commonly found in SOCs involves the following elements:

KEY1 is a 2048-bit RSA Root public key that is burned into a One-Time Programmable (OTP) fuse for immutability and as a root of trust. KEY1 is used to verify the signature of KEY2, another 2048-bit RSA External Root public key stored in the clear in flash storage that allows for the renewal of KEY2. KEY1 is typically common for all devices of the manufacturer while KEY2 is specific to the Service Provider or some trusted Third Party.

Boot Loader Root Key is a third 2048-bit RSA Root Key that is burnt into the OTP and used to verify the signature of a symmetric AES 128 key, KEY3, stored in flash memory. KEY3 is then used to verify the signature of other code blobs of the boot ROM including the OS.

Lpriv is a fourth 2048-bit RSA private key that is unique to the device. Lpriv is used to authenticate the device.

FIG. 5 shows this code blob layout and the logical relationship between the keys and the code blobs. It will be understood that all elements shown on chipset 501 are part of the secure processing zone, while flash memory 504 lies in the non-secure zone. Elements S0-S3 illustrate fast boot verification in the secure execution environment, while S4-S8 illustrate fast boot image signature verification. An example process will now be described with reference to this figure:

S0. Boot ROM 502 computes the SHA-256 hash (H2) of the External Root RSA Public Key (KEY2).

S1. Boot ROM 502 reads Root RSA Public Key (KEY1) in OTP 506 and uses KEY1 to decrypt the signature of KEY2 that is stored in flash. The decrypted signature of KEY2 is compared to H2.

S2. Boot ROM checks the signature SF2 of the Fast Boot Image using KEY2. This is done by decrypting SF2 with KEY2 and comparing the decrypted value with the SHA-256 hash of the Fast Boot Image.

S3. Boot up the Fast Boot 510.

S4. Fast Boot 510 checks the signature of the AES CBC Key (KEY3) which is stored encrypted in flash.

S4a. First, Fast Boot 510 decrypts the encrypted KEY3 using the BL_RootKey (KEY4) stored in the OTP;

S4b. Next, Fast Boot 510 calculates AES CBC-MAC signature of the KEY3 using an intermediate key derived from KEY4 and KEY5.

S4c. The signature of KEY3 is decrypted using the Key Blob AES_CBC_key (KEY5).

S4d. The output of S4b and S4c are compared to verify the integrity of KEY3. It should be noted that the non-secure processor cannot read the OTP values. Accordingly, Fast Boot 510 is run on the secure processor in secure processing zone 110.

S5. Fast Boot 510 checks the signature of Bootargs 512 also using KEY3.

S6. Fast Boot 510 checks the signature of the Recovery 514 code blob also using KEY3.

S7. Fast Boot 510 checks the signature of the kernel 516 also using KEY3.

S8. Fast Boot 510 checks the signature of the System 518 also using KEY3.

S9. After these steps, control can pass to the kernel.

For managed user devices, KEY1 and KEY2 are 2048 bits long and are supplied by the original equipment manufacturer. If the operating system supports third party app installation, e.g. Android, the system is modified to only allow apps signed with known Certificate Authorities and approved by the service provider. For unmanaged devices, KEY1 and KEY2 are 2048 bits long and are supplied by a trusted third party entity or service provider. In at least one embodiment, chipset 501 does not support one-time-programmable and secure boot; in this embodiment, KEY3 can be used to authenticate the operating system using AES encryption and a white-box AES decryptor is included in the fast boot image.

After secure boot, the firmware and OS authenticity has been verified, i.e. BA1 and BA2 of FIG. 3 have been performed. The procedure for start-up then proceeds to the next two elements, i.e. BA3 and BA4 in FIG. 3, which together are called device registration. BA3 retrieves the authentication request from the kernel and relays it to the backend server in BA4. The mutual authentication is between DRM server 302 and the combination of user device and app 104-the app is included to distinguish from other authorized guest apps.

Figure 6:
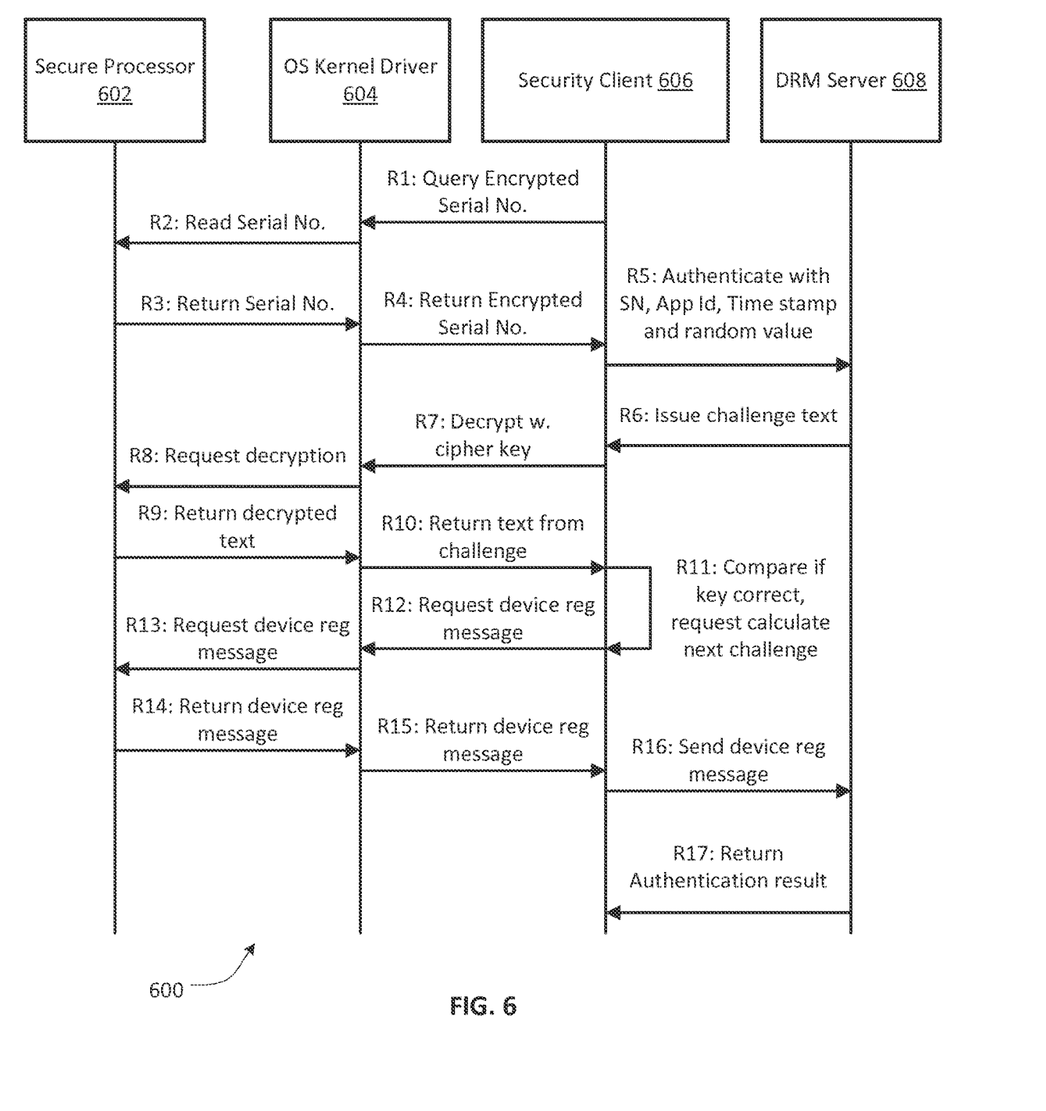
FIG. 6 depicts a block diagram of the last two elements in the establishment of a trust relationship of FIG. 3 in greater detail according to an embodiment of the present patent disclosure.

The registration process is illustrated in FIG. 6. Four elements participate in the registration process: secure processor 602 operates in secure processing zone 110, OS kernel Driver 604 and Security client 606 operate in the non-secure zone 108, and DRM server 608 is available over a network connection that is secured by SSL. Notably, is security client 606 is embodied at a network server, the registration process is not used. The registration process proceeds as follows:

R1. Security client 606 starts the process of constructing a registration message by requesting authentication information, which will be sent to DRM server 608. The request uses a special kernel call (API-A), which will result in a message encrypted with Lpriv. This message contains device-specific and confidential information, which in the embodiment shown is a Serial Number, although other information meeting the criteria can also be used. Although not specifically shown in the drawing, the message also contains an App ID for application 104, time stamp and nonce as shown in the example below where '+' represents a concatenation operation: Serial_Number (256 byte)+ App_ID (4 bytes)+ Host_Time_Stamp (14 bytes)+ random_cryptographic_nonce_1 (16 bytes)

where the Serial Number is the 2048-bit device-specific SSL client private key

R2-R4. The request requires encryption that can only be performed in secure processing zone 110 and OS kernel driver 604 forwards the request to Secure processor 602. Secure processor 602 returns the requested encrypted information to OS Kernel Driver 604, which returns the encrypted information to security client 606.

R5. Security client 606 sends the authentication message to DRM server 608. DRM server 608 receives the message and validates the App_ID, Serial Number, and other information.

R6. DRM server 608 encrypts the received information using L_pub and sends this encrypted message as a challenge text back to security client 606.

R7. Security client 606 sends a request to the kernel to decrypt the message with L_priv. The request uses a second special kernel call (API-B).

R8-R10. Secure processor 602 receives the request, decrypts the received challenge text, and returns the decrypted challenge text to OS kernel driver 604, which returns the challenge text to security client 606.

R11. Security client 606 verifies the time stamp, nonce, etc. contained in the challenge text.

R12. Security client 606 requests the kernel for a device registration message.

R13-R15. OS kernel driver 604 calls on secure processor 602 to create a registration message. Secure processor 602 returns a registration message to kernel driver 604, which returns the registration message to security client 606. The registration message is encrypted with L_priv and has the following format: (Device_ID_Token+'#'+OS_Time_Stamp+'#'+ random_nonce_1) where Device_ID_Token is the SHA-256 hash of the serial number.

R16. Security client 606 sends the device registration message to DRM server 608.

R17. DRM server 608 decrypts the message with the public key L_pub corresponding to L_priv, verifies the timestamp and nonce, uses Device_ID_Token as the device identification for device registration, and returns the result of the device registration back to security client 606.

It should be appreciated that the embodiments of the present disclosure can advantageously provide an additional layer of security in the distribution of encrypted audiovisual programs. The encrypted content encryption keys can be sent to a user device over a non-secure connection or can add additional security even when a secure connection is available and used.

In the foregoing Detailed Description, functionalities of the various elements including components/blocks labeled or described as "module" or "process" or "processor" or "controller" or "computer" may be provided through the use of dedicated hardware as well as hardware capable of executing stored or preconfigured software. When provided by a processor, the functions may be provided by a single dedicated processor, by a single shared processor, or by a plurality of individual processors, some of which may be shared or distributed. Moreover, a "processor" or "controller" or "memory" may include, without limitation, digital signal processor (DSP) hardware, ASIC hardware, read only memory (ROM), random access memory (RAM), and/or other storage media.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A user device comprising:
 a processor;
 a non-secure processing zone that comprises a content request application; and
 a secure processing zone that comprises;
  a secure memory;
  a streaming content player;
  a secure application program interface (API) for receiving requests from the content request application; and
  a decryptor, configured:
   to receive a manifest for requested content, the manifest enabling access to a requested media stream at multiple bitrates for viewing the requested media stream and providing a Content Encryption Key (CEK) that is encrypted using a public Key Encryption Key (KEK), a corresponding private KEK being stored in the secure memory;
   to decrypt the corresponding private KEK using a root key stored in a one-time-programmable memory in the secure processing zone and thereby decrypt the CEK to create a decrypted CEK;
   to decrypt the requested content using the decrypted CEK to form decrypted content; and
   to provide the decrypted content to a decoder in the secure processing zone;
 the user device further including a security client configured to establish a secure connection with a digital rights management (DRM) server and to mediate a mutual authentication of the user device with the DRM server over the secure connection.

2. The user device as recited in claim 1 wherein the secure processing zone is configured to implement a process to verify that the secure API is valid and that the security client is valid prior to performing the mutual authentication with the DRM server.

3. The user device as recited in claim 2 in which the security client establishing a secure connection with the DRM server includes establishing a secure SSL connection using a device specific SSL certificate and the root key, and the mutual authentication with the DRM server includes the security client sending a message that contains information specific to the user device, the information encrypted with the root key.

4. The user device as recited in claim 2 in which the security client is embedded in the content request application and the security client is further configured to receive the manifest from a content control server in a content distribution network and to provide the manifest to the decryptor.

5. The user device as recited in claim 3 it in which the decryptor receives the manifest from a content control server that is part of a content distribution network.

6. The user device as recited in claim 1, in which the CEK, the corresponding private KEK, and the root key are AES-128 keys.

7. The user device as recited in claim 1, in which the secure processing zone is ARM TrustZone.

8. A method for securing streaming content on a user device having a secure processing zone and a non-secure processing zone, the method comprising:
    establishing, using a security client on the user device, a secure connection with a digital rights management (DRM) server and mediating a mutual authentication of the user device with the DRM server over the secure connection:
    receiving, in the secure processing zone, a manifest for requested content, the manifest enabling access to a requested media stream at multiple bitrates for viewing the requested media stream and providing a Content Encryption Key (CEK) that is encrypted using a public Key Encryption Key (KEK), a corresponding private KEK being stored in the secure memory:
    decrypting the corresponding private KEK using a root key stored in a one-time-programmable memory in the secure processing zone and thereby decrypting the CEK to create a decrypted CEK;
    decrypting the requested content using the decrypted CEK to form decrypted content; and
    providing the decrypted content to a decoder in the secure processing zone.

9. The method as recited in claim 8 including the secure processing zone implementing a process to verify that the security client is valid and that a secure application programming interface (API) is valid prior to performing the mutual authentication with the DRM server, the secure API providing an interface between the security client and the secure processing zone.

10. The method as recited in claim 9 in which the security client establishing a secure connection with the DRM server includes establishes a secure SSL connection using a device specific SSL certificate and the root key, and the mutual authentication with the DRM server includes the security client sending a message that contains information specific to the user device, the information encrypted with the root key.

11. The method as recited in claim 9 further comprising:
    receiving a firmware-level distribution message containing a first key identification and the first private KEK that is encrypted using the root key stored in the secure storage; and
    storing the first key identification and the first private KEK in the secure storage.

12. The method as recited in claim 11 wherein the firmware-level distribution message comprises a plurality of private KEKs each having a corresponding key identification and storing the plurality of private KEKs and the corresponding key identification in the secure storage.

13. The method as recited in claim 11 further comprising receiving a firmware-level replacement message containing the first key identification and a second private KEK encrypted using the root key and replacing the first private KEK with the second private KEK.

14. The method as recited in claim 11 further comprising receiving a firmware-level revocation message containing the first key identification and revoking the first private KEK.

15. The method as recited in claim 11 wherein the CEK, the first private KEK, and the root key are AES-128 keys.

16. The method as recited in claim 11 including receiving the requested streaming content using one of HTTP Live Streaming (HLS) and Dynamic Adaptive Streaming over HTTP (DASH) protocol.

17. The method as recited in claim 9 including receiving the manifest from a content control server in a content distribution network.

18. The method as recited in claim 9 including receiving the manifest via the security client.

19. A non-transitory computer-readable medium containing instructions stored thereon which, when executed by a client device having a secure processing zone and a non-secure processing zone, perform the acts:
    establishing, using a security client on the user device, a secure connection with a digital rights management (DRM) server and mediating a mutual authentication of the user device with the DRM server over the secure connection:
    receiving, in the secure processing zone, a manifest for requested content, the manifest enabling access to a requested media stream at multiple bitrates for viewing the requested media stream and providing a Content Encryption Key (CEK) that is encrypted using a public Key Encryption Key (KEK), a corresponding private KEK being stored in the secure memory;
    decrypting the corresponding private KEK using a root key stored in a one-time-programmable memory in the secure processing zone and thereby decrypting the CEK to create a decrypted CEK;
    decrypting the requested content using the decrypted CEK to form decrypted content; and
    providing the decrypted content to a decoder in the secure processing zone.

20. The non-transitory computer-readable medium as recited in claim 19 in which the instructions further perform the acts of the secure processing zone implementing a process to verify that the security client is valid and that a secure application programming interface (API) is valid prior to performing the mutual authentication with the DRM server, the secure API providing an interface between the security client and the secure processing zone.

* * * * *

UNITED STATES PATENT AND TRADEMARK OFFICE
CERTIFICATE OF CORRECTION

PATENT NO. : 11,228,427 B2
APPLICATION NO. : 14/618598
DATED : January 18, 2022
INVENTOR(S) : Nair et al.

It is certified that error appears in the above-identified patent and that said Letters Patent is hereby corrected as shown below:

In the Specification

In Column 11, Line 56, delete "AN data" and insert -- A/V data --, therefor.

In the Claims

In Column 16, Line 18, in Claim 1, delete "comprises;" and insert -- comprises: --, therefor.

In Column 16, Line 65, in Claim 5, delete "it in which" and insert -- in which --, therefor.

In Column 17, Line 13, in Claim 8, delete "connection:" and insert -- connection; --, therefor.

In Column 17, Line 20, in Claim 8, delete "memory:" and insert -- memory; --, therefor.

In Column 18, Line 30, in Claim 19, delete "connection:" and insert -- connection; --, therefor.

Signed and Sealed this
Fourth Day of April, 2023

Katherine Kelly Vidal
*Director of the United States Patent and Trademark Office*